(12) United States Patent
Margolin (10) Patent No.: US 11,544,460 B1
(45) Date of Patent: Jan. 3, 2023

(54) ADVERSARIAL ANONYMIZATION AND PRESERVATION OF CONTENT

(71) Applicant: Intuit Inc., Mountain View, CA (US)

(72) Inventor: Itay Margolin, Petach Tikva (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/874,007

(22) Filed: Jul. 26, 2022

(51) Int. Cl.
*G10L 15/00* (2013.01)
*G06F 40/279* (2020.01)
*G06F 40/30* (2020.01)
*G06N 3/04* (2006.01)

(52) U.S. Cl.
CPC ............ *G06F 40/279* (2020.01); *G06F 40/30* (2020.01); *G06N 3/0445* (2013.01)

(58) Field of Classification Search
None
See application file for complete search history.

(56) References Cited

U.S. PATENT DOCUMENTS

| | | | | |
|---|---|---|---|---|
| 10,554,669 | B2 * | 2/2020 | Calcaterra | G06F 3/048 |
| 2005/0251865 | A1 * | 11/2005 | Mont | G06F 21/6245 726/26 |
| 2018/0082068 | A1 * | 3/2018 | Lancioni | G06F 21/84 |
| 2019/0260784 | A1 * | 8/2019 | Stockdale | H04L 63/1416 |
| 2021/0012179 | A1 * | 1/2021 | Kalia | G06F 40/289 |
| 2022/0179892 | A1 * | 6/2022 | Kermode | G06N 5/022 |

* cited by examiner

*Primary Examiner* — Satwant K Singh
(74) *Attorney, Agent, or Firm* — Paradice and Li LLP (57) ABSTRACT

Systems and methods for anonymizing content suggestive of a particular characteristic while preserving relevant content are disclosed. An example method may be performed by one or more processors of a protection system and include defining an anonymization loss indicative of an accuracy at which a trained discriminator model can predict a particular characteristic, defining a content loss indicative of a difference between latent representations of versions of a document, defining a combined objective function incorporating the anonymization and content losses, extracting and anonymizing suggestive content from training documents while preserving relevant content, and adversarially training, using the associated accuracies and differences in the combined objective function, a transformation model to transform a given document representative of credentials of a given person possessing the particular characteristic into an anonymized document maximizing a predicted uncertainty of the trained discriminator model while simultaneously maximizing an amount of relevant information about the person preserved.

20 Claims, 5 Drawing Sheets

┌─────────────────────────────────────────────────────────────────────────────┐
│ Define an anonymization loss indicative of an accuracy at which a trained discriminator model can │
│ predict a particular characteristic of a person given a document representative of the person's │
│ credentials. (310) │
└─────────────────────────────────────────────────────────────────────────────┘
                                        ↓
┌─────────────────────────────────────────────────────────────────────────────┐
│ Define a content loss indicative of a difference between a latent representation of a first version of │
│ the document and a latent representation of a second version of the document. (320) │
└─────────────────────────────────────────────────────────────────────────────┘
                                        ↓
┌─────────────────────────────────────────────────────────────────────────────┐
│ Define a combined objective function incorporating the anonymization loss and the content loss and │
│ minimizing the accuracy while simultaneously minimizing the difference. (330) │
└─────────────────────────────────────────────────────────────────────────────┘
                                        ↓
┌─────────────────────────────────────────────────────────────────────────────┐
│ Extract, from each of a plurality of training documents, at least one sequence of words that, based │
│ on a context of the words in the sequence, suggests that a person associated with the training │
│ document possesses the particular characteristic. (340) │
└─────────────────────────────────────────────────────────────────────────────┘
                                        ↓
┌─────────────────────────────────────────────────────────────────────────────┐
│ Generate, for each extracted sequence, an anonymized sequence less suggestive of the particular │
│ characteristic and preserving at least some relevant information about the person. (350) │
└─────────────────────────────────────────────────────────────────────────────┘
                                        ↓
┌─────────────────────────────────────────────────────────────────────────────┐
│ Transform each training document into a corresponding test document including the anonymized │
│ sequences in place of the suggestive sequences. (360) │
└─────────────────────────────────────────────────────────────────────────────┘
                                        ↓
┌─────────────────────────────────────────────────────────────────────────────┐
│ Determine, for each test document, an accuracy at which the trained discriminator model predicts │
│ that the associated person possesses the particular characteristic. (370) │
└─────────────────────────────────────────────────────────────────────────────┘
                                        ↓
┌─────────────────────────────────────────────────────────────────────────────┐
│ Determine, for each test document, a difference between a latent representation of the test document │
│ and a latent representation of the corresponding training document. (380) │
└─────────────────────────────────────────────────────────────────────────────┘
                                        ↓
┌─────────────────────────────────────────────────────────────────────────────┐
│ Adversarially train, using the determined accuracies and the determined differences in the combined │
│ objective function, a transformation model to transform a given document representative of │
│ credentials of a given person possessing the particular characteristic into an anonymized document │
│ maximizing a predicted uncertainty of the trained discriminator model while simultaneously │
│ maximizing an amount of relevant information about the person preserved. (390) │
└─────────────────────────────────────────────────────────────────────────────┘

ADVERSARIAL ANONYMIZATION AND PRESERVATION OF CONTENT

TECHNICAL FIELD

This disclosure relates generally to content anonymization, and specifically to using an adversarial machine learning (ML) process to anonymize suggestive content and preserve relevant content.

DESCRIPTION OF RELATED ART

When applying for an opportunity (e.g., a job), applicants generally provide a biographical summary (e.g., a resume or curriculum vitae) to an authority that may be in a position to decide whether the applicant is granted the opportunity. The biographical summary may include relevant information about the applicant, such as the applicant's contact information, education, experience, skills, etc. In some instances, the biographical summary may include information suggestive of a particular characteristic of the applicant, such as the applicant's gender, race, age, marital status, or the like, and, in some instances, the authority may inappropriately decide whether to grant the applicant the opportunity based on the suggestive information.

In an effort to preempt this, some applicants may attempt to remove suggestive information from their biographical summaries, such as their name, their native language, or any other potentially suggestive information. Nonetheless, some authorities may still infer characteristics about said applicants. For example, an applicant's biographical summary may indicate that the applicant served in the Vietnam War, and an authority (such as a school board) may decide whether to grant the applicant an opportunity (such as a teaching position) based on inferring that the applicant is over 65 years old, rather than based on the applicant's relevant credentials (such as teaching experience). As a result, the applicant may refrain from indicating that they served in the Vietnam War, even if the information is relevant, such as if the opportunity is a position for teaching military history.

Therefore, there is a need for applicants to have a means for generating biographical summaries that do not include information suggestive of particular characteristics of the applicants, as well as a need for applicants to have a means for generating biographical summaries that preserve relevant information about the applicants' credentials.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for adversarially training a transformation model to anonymize content suggestive of a particular characteristic while preserving relevant content. An example method may be performed by one or more processors of a protection system and include defining an anonymization loss indicative of an accuracy at which a trained discriminator model can predict a particular characteristic of a person given a document representative of the person's credentials, defining a content loss indicative of a difference between a latent representation of a first version of the document and a latent representation of a second version of the document, defining a combined objective function incorporating the anonymization loss and the content loss and minimizing the accuracy while simultaneously minimizing the difference, extracting, from each of a plurality of training documents, at least one sequence of words that, based on a context of the words in the sequence, suggests that a person associated with the training document possesses the particular characteristic, generating, for each extracted sequence, an anonymized sequence less suggestive of the particular characteristic and preserving at least some relevant information about the person, transforming each training document into a corresponding test document including the anonymized sequences in place of the suggestive sequences, determining, for each test document, an accuracy at which the trained discriminator model predicts that the associated person possesses the particular characteristic, determining, for each test document, a difference between a latent representation of the test document and a latent representation of the corresponding training document, and adversarially training, using the determined accuracies and the determined differences in the combined objective function, a transformation model to transform a given document representative of credentials of a given person possessing the particular characteristic into an anonymized document maximizing a predicted uncertainty of the trained discriminator model while simultaneously maximizing an amount of relevant information about the person preserved.

In some implementations, the discriminator model is a natural-language processing (NLP) model, and an encoder of the discriminator model incorporates one or more aspects of a long short-term memory (LSTM) model or a bidirectional transformer model incorporating one or more aspects of next sentence prediction (NSP) or a masked language model (MLM). In some aspects, the discriminator model is trained using sample documents each labeled based on whether a person associated with the sample document possesses the particular characteristic, where the discriminator model is trained based on detecting content in the sample documents suggestive of the particular characteristic and predicting a label for each of the sample documents, and where an accuracy of the discriminator model is optimized using a discriminatory loss function minimizing a cross entropy between the predicted labels and the assigned labels.

In some other implementations, the difference between the latent representations represents an amount of relevant information about the person lost during a transformation of the first version of the document to the second version of the document. In some instances, the relevant information includes at least one of the person's contact information, the person's education, the person's work experience, the person's honors or awards, the person's competencies or skills, the person's research or publications, the person's licenses or certificates, the person's memberships or affiliations, the person's interests or preferences, or the person's hobbies or activities. In some implementations, the latent representation of the first version of the document is a first vector including embedded values corresponding to a positional context of relevant features extracted from the first version of the document, and the latent representation of the second version of the document is a second vector including embedded values corresponding to a positional context of relevant features extracted from the second version of the document, where the difference between the latent representations is determined based on a cosine similarity or a cosine distance between the first vector and the second vector in a vector space. In some instances, a trained embedding model extracts the relevant features from the documents based on a contextual meaning of sequences of words in the documents, where the embedding model is an NLP model trained using one or more aspects of a Bidirectional Encoder Representations from Transformers (BERT) model, an Embeddings from Language Models (ELMo) model, or a Global Vectors for Words Representations (GloVe) model.

In some aspects, each of the training documents is at least one of a curriculum vitae (CV), a resume, a profile, or a biographical summary of the person, where the document is associated with an opportunity for which the person may apply, where the relevant information about the person is applicable to the opportunity, where the opportunity is at least one of a job, a position, a benefit, a license, an award, a membership, a loan, a scholarship, or an admittance, and where the particular characteristic is at least one of a gender of the person, a race of the person, an ethnicity of the person, a color of the person's skin, genetic information associated with the person, a disability status of the person, a national origin of the person, a current nationality of the person, a religious belief associated with the person, the person's age, the person's marital status, a number of children associated with the person, whether the person has changed genders, or a pregnancy or leave associated with the person.

In some instances, the context of the words in the sequences is determined using one or more aspects of a contextual natural-language processing (NLP) model trained to transform an input sequence into an anonymized output sequence. In some implementations, the contextual NLP model incorporates one or more aspects of at least one of a recurrent neural network (RNN), an Attention-based bidirectional transformer model, an LSTM model, or a gated recurrent unit (GRU) mechanism.

Another innovative aspect of the subject matter described in this disclosure can be implemented in a system for adversarially training a transformation model to anonymize content suggestive of a particular characteristic while preserving relevant content. An example system may include one or more processors and a memory storing instructions for execution by the one or more processors. Execution of the instructions may cause the system to perform operations including defining an anonymization loss indicative of an accuracy at which a trained discriminator model can predict a particular characteristic of a person given a document representative of the person's credentials, defining a content loss indicative of a difference between a latent representation of a first version of the document and a latent representation of a second version of the document, defining a combined objective function incorporating the anonymization loss and the content loss and minimizing the accuracy while simultaneously minimizing the difference, extracting, from each of a plurality of training documents, at least one sequence of words that, based on a context of the words in the sequence, suggests that a person associated with the training document possesses the particular characteristic, generating, for each extracted sequence, an anonymized sequence less suggestive of the particular characteristic and preserving at least some relevant information about the person, transforming each training document into a corresponding test document including the anonymized sequences in place of the suggestive sequences, determining, for each test document, an accuracy at which the trained discriminator model predicts that the associated person possesses the particular characteristic, determining, for each test document, a difference between a latent representation of the test document and a latent representation of the corresponding training document, and adversarially training, using the determined accuracies and the determined differences in the combined objective function, a transformation model to transform a given document representative of credentials of a given person possessing the particular characteristic into an anonymized document maximizing a predicted uncertainty of the trained discriminator model while simultaneously maximizing an amount of relevant information about the person preserved.

Another innovative aspect of the subject matter described in this disclosure can be implemented as a non-transitory computer-readable medium storing instructions that, when executed by one or more processors of a system for adversarially training a transformation model to anonymize content suggestive of a particular characteristic while preserving relevant content, cause the system to perform operations. Example operations may include defining an anonymization loss indicative of an accuracy at which a trained discriminator model can predict a particular characteristic of a person given a document representative of the person's credentials, defining a content loss indicative of a difference between a latent representation of a first version of the document and a latent representation of a second version of the document, defining a combined objective function incorporating the anonymization loss and the content loss and minimizing the accuracy while simultaneously minimizing the difference, extracting, from each of a plurality of training documents, at least one sequence of words that, based on a context of the words in the sequence, suggests that a person associated with the training document possesses the particular characteristic, generating, for each extracted sequence, an anonymized sequence less suggestive of the particular characteristic and preserving at least some relevant information about the person, transforming each training document into a corresponding test document including the anonymized sequences in place of the suggestive sequences, determining, for each test document, an accuracy at which the trained discriminator model predicts that the associated person possesses the particular characteristic, determining, for each test document, a difference between a latent representation of the test document and a latent representation of the corresponding training document, and adversarially training, using the determined accuracies and the determined differences in the combined objective function, a transformation model to transform a given document representative of credentials of a given person possessing the particular characteristic into an anonymized document maximizing a predicted uncertainty of the trained discriminator model while simultaneously maximizing an amount of relevant information about the person preserved.

Another innovative aspect of the subject matter described in this disclosure can be implemented as a method for anonymizing content suggestive of a particular characteristic while preserving relevant content. An example method may be performed by one or more processors of a protection system and include obtaining an original document representative of credentials of a person that possesses a particular characteristic, extracting, from the original document, one or more sequences of words suggestive of the particular characteristic based on a context of the words in the sequence, generating, using a transformation model adversarially trained against a discriminator model in conjunction with an embedding model, an anonymized sequence for each of the extracted sequences, each of the anonymized sequences less suggestive of the particular characteristic and preserving at least some relevant information about the person, the discriminator model trained to predict whether a given person associated with a given document possesses the particular characteristic, and the embedding model trained to extract relevant features from the given document based on a contextual meaning of sequences of words in the given document, and transforming the original document into a new document including the anonymized sequences in place of the corresponding suggestive sequences and maximizing a predicted uncertainty of the discriminator model while simultaneously maximizing an amount of the relevant information preserved.

In some implementations, the original document is at least one of a curriculum vitae (CV), a resume, a profile, or a biographical summary of the person, where the document is associated with an opportunity for which the person may apply, where the relevant information about the person is applicable to the opportunity, and where the opportunity is at least one of a job, a position, a benefit, a license, an award, a membership, a loan, a scholarship, or an admittance. In some other implementations, the particular characteristic is at least one of a gender of the person, a race of the person, an ethnicity of the person, a color of the person's skin, genetic information associated with the person, a disability status of the person, a national origin of the person, a current nationality of the person, a religious belief associated with the person, the person's age, the person's marital status, a number of children associated with the person, whether the person has changed genders, or a pregnancy or leave associated with the person.

In some aspects, the context of the words in the one or more sequences is determined using one or more aspects of a contextual natural-language processing (NLP) model trained to transform an input sequence into an anonymized output sequence, where the contextual NLP model incorporates one or more aspects of at least one of a recurrent neural network (RNN), an Attention-based bidirectional transformer model, a long short-term memory (LSTM) model, or a gated recurrent unit (GRU) mechanism. In some other aspects, the transformation model is adversarially trained using a combined objective function defined to minimize an anonymization loss indicative of an accuracy at which the discriminator model predicts whether a given person possesses the particular characteristic while simultaneously minimizing a content loss indicative of a difference between a latent representation of the given document and a latent representation of an anonymized document transformed from the given document.

In some instances, the discriminator model is an NLP model incorporating one or more aspects of an LSTM model or a bidirectional transformer model incorporating one or more aspects of next sentence prediction (NSP) or a masked language model (MLM). In some instances, the embedding model is an NLP model incorporating one or more aspects of a Bidirectional Encoder Representations from Transformers (BERT) model, an Embeddings from Language Models (ELMo) model, or a Global Vectors for Words Representations (GloVe) model.

In some implementations, the relevant information includes at least one of the person's contact information, the person's education, the person's work experience, the person's honors or awards, the person's competencies or skills, the person's research or publications, the person's licenses or certificates, the person's memberships or affiliations, the person's interests or preferences, or the person's hobbies or activities. In some instances, the new document is provided to the person or an associated entity.

Another innovative aspect of the subject matter described in this disclosure can be implemented in a system for anonymizing content suggestive of a particular characteristic while preserving relevant content. An example system may include one or more processors and a memory storing instructions for execution by the one or more processors. Execution of the instructions may cause the system to perform operations including obtaining an original document representative of credentials of a person that possesses a particular characteristic, extracting, from the original document, one or more sequences of words suggestive of the particular characteristic based on a context of the words in the sequence, generating, using a transformation model adversarially trained against a discriminator model in conjunction with an embedding model, an anonymized sequence for each of the extracted sequences, each of the anonymized sequences less suggestive of the particular characteristic and preserving at least some relevant information about the person, the discriminator model trained to predict whether a given person associated with a given document possesses the particular characteristic, and the embedding model trained to extract relevant features from the given document based on a contextual meaning of sequences of words in the given document, and transforming the original document into a new document including the anonymized sequences in place of the corresponding suggestive sequences and maximizing a predicted uncertainty of the discriminator model while simultaneously maximizing an amount of the relevant information preserved.

Another innovative aspect of the subject matter described in this disclosure can be implemented as a non-transitory computer-readable medium storing instructions that, when executed by one or more processors of a system for anonymizing content suggestive of a particular characteristic while preserving relevant content, cause the system to perform operations. Example operations may include obtaining an original document representative of credentials of a person that possesses a particular characteristic, extracting, from the original document, one or more sequences of words suggestive of the particular characteristic based on a context of the words in the sequence, generating, using a transformation model adversarially trained against a discriminator model in conjunction with an embedding model, an anonymized sequence for each of the extracted sequences, each of the anonymized sequences less suggestive of the particular characteristic and preserving at least some relevant information about the person, the discriminator model trained to predict whether a given person associated with a given document possesses the particular characteristic, and the embedding model trained to extract relevant features from the given document based on a contextual meaning of sequences of words in the given document, and transforming the original document into a new document including the anonymized sequences in place of the corresponding suggestive sequences and maximizing a predicted uncertainty of the discriminator model while simultaneously maximizing an amount of the relevant information preserved.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 3 shows an illustrative flowchart depicting an example operation for adversarially training a transformation model to anonymize content suggestive of a particular characteristic while preserving relevant content, according to some implementations.

Like numbers reference like elements throughout the drawings and specification.

DETAILED DESCRIPTION

As described above, there is a need for applicants to have a means for generating biographical summaries that do not include information suggestive of particular characteristics of the applicants, and a need for applicants to have a means for generating biographical summaries that preserve relevant information about the applicants' credentials. As some authorities could attempt to deploy machine learning (ML)-based systems in an effort to predict whether applicants possess particular characteristics, there is further a need for a computer-based system that can assist applicants in generating biographical summaries that can outsmart (or "fool") such ML-based discriminator models. Aspects of the present disclosure recognize that, as an ML-based discriminator could become quite accurate at predicting whether an applicant possesses a particular characteristic, a biographical summary generated to outsmart the discriminator may undergo significant changes. However, if relevant and/or fitness-related information about the applicant is omitted, aspects of the present disclosure recognize that an applicant may be denied an opportunity for which the applicant is the "best" candidate if the reviewing authority is unaware of the applicant's pertinent credentials. Thus, there is further a need for a computer-based system that can generate a biographical summary that outsmarts a discriminator while simultaneously preserving relevant and/or fitness-related information about the applicant.

Implementations of the subject matter described in this disclosure may be used in adversarially training a transformation model to anonymize content suggestive of a particular characteristic while preserving relevant content and/or in using a transformation model adversarially trained to anonymize content suggestive of a particular characteristic while preserving relevant content. In some implementations, the transformation model is adversarially trained against a discriminator model in conjunction with an embedding model, where the discriminator model is trained to predict whether a given person associated with a given document possesses the particular characteristic, and where the embedding model is trained to extract relevant features from the given document based on a contextual meaning of sequences of words in the given document. The adversarially trained transformation model may be used in transforming an original document into a new document including anonymized sequences in place of suggestive sequences such that a predicted uncertainty of the discriminator model and an amount of relevant information preserved in the new document are maximized. In some instances, the discriminator model, embedding model, and/or transformation model incorporate one or more aspects of natural-language processing (NLP), as further described below.

Implementations of the subject matter described in this disclosure may provide one or more benefits such as adversarially training a transformation model to anonymize content suggestive of a particular characteristic while preserving relevant content, defining a combined objective function, extracting sequences of words from a document suggestive of an associated person possessing a particular characteristic, generating anonymized sequences less suggestive of particular characteristics and preserving at least some relevant and/or fitness-related information about the associated person, transforming a document into an anonymized document including anonymized sequences in place of suggestive sequences, and/or providing an anonymized document (e.g., to a person) preserving relevant and/or fitness-related content (e.g., about the person).

Furthermore, implementations of the subject matter described in this disclosure may provide one or more benefits such as protecting applicants from discrimination, assisting applicants with preparing or modifying biographical summaries, fooling a trained discriminator, assisting authorities and/or human resources (HR) departments with hiring, routing relevant biographical summaries to appropriate authorities or third-parties, increasing user satisfaction, and so on.

For purposes of discussion herein, a "system" may refer to any appropriate system for adversarially training a transformation model to anonymize content suggestive of a particular characteristic while preserving relevant content and/or for using a transformation model adversarially trained to anonymize content suggestive of a particular characteristic while preserving relevant content, such as like the systems described in connection with FIGS. 1-5.

For purposes of discussion herein, a "document" may refer to a data object indicative of information about an entity (e.g., a person, a group of people, a user, an organization, or another appropriate entity) that can possess a characteristic. The document may be associated with an opportunity for which the entity may apply. For example, the document may be an electronic or digital representation of at least a portion of a curriculum vitae (CV), a resume, a profile, a biographical summary, or any other appropriate representation of an entity's credentials. Although as used herein a "document" generally refers to a biographical summary of an entity (or "applicant") meant to use the document in applying for an opportunity, it is to be understood that a document may indicate information about a group of people, an organization, or another appropriate entity that can possess one or more characteristics or attributes. Although as used herein "information" (or "content") in a document generally refers to text (i.e., data in the form of words or alphabetic characters), it is to be understood that other forms of data (e.g., images, videos, audio, temporal data, or another suitable form of content) may be indicative and/or suggestive of an associated entity's characteristics, and, in light of aspects of the present disclosure, a transformation model may be trained to detect a suggestive image in a document, for example, embedded in one or more vectors, and transformed into new content anonymized to a first desired extent, while simultaneously preserving a second desired extent of at least one of the relevant and/or fitness-related content.

For purposes of discussion herein, a "characteristic" may also be referred to as a quality, a category, a trait, a feature, a type, a class, or an attribute of (or "possessed by" or "belonging to") an applicant that is generally irrelevant to determining whether the applicant qualifies for an opportunity. As used herein, "irrelevant" information refers to information that could be used (such as by an authority and/or an ML model) to "classify" (or "categorize," "differentiate," "distinguish," or "characterize") an applicant in a discriminatory, unjust, prejudicial, illegal, unethical, or otherwise inappropriate manner. In some implementations, an applicant's particular characteristic(s) may be officially "protected" (such as by one or more laws) and include, for example, at least one of a gender, a race, an ethnicity, a skin color, genetics, a disability, a national origin, a current nationality, a religious belief, an age, a marital status, a number of children, a history of gender, a pregnancy, a leave, or another characteristic associated with the applicant and protected in an official manner. In some other implementations, irrelevant information about an applicant—even if not officially protected—may be "protected" by one or more rules, guidelines, beliefs, standards, ethics, agreements, or the like, such that, under the circumstances, it would be inappropriate for an authority to decide whether to grant the applicant the opportunity based on the irrelevant information.

In contrast, for purposes of discussion herein, "relevant" information about an applicant may refer to meaningful information about (or credentials of) an applicant applicable to an opportunity, which, in some instances, may include one or more of the applicant's contact information, education, work experience, honors, awards, competencies, skills, research, publications, licenses, certificates, memberships, affiliations, interests, preferences, hobbies, activities, or other information appropriate for an authority to consider in determining whether to grant an applicant an opportunity. As used herein, an "authority" may generally refer to an entity (such as a manager, a committee, an HR department, an ML model, or the like) in a position to at least partially decide whether the applicant is granted (or denied) the opportunity based on the information in the applicant's document. As used herein, an "opportunity" may generally refer to a job, a position, a benefit, a license, an award, a membership, a loan, a scholarship, an admittance, or other appropriate opportunity for which an applicant may apply. For example, a person may submit a CV to an HR department for consideration of a job, and one or more authorities may determine whether the person is to be hired based on content in the document.

For purposes of discussion herein, information "suggestive" of a particular characteristic may refer to content in the document that may increase a statistical likelihood that an authority—which may include an ML model—will (correctly or incorrectly) determine, detect, predict, or otherwise infer that an associated applicant possesses the particular characteristic. As used herein, "anonymizing" (or "transforming" or "generating a new version of") a document generally refers to removing, converting, changing, replacing, or otherwise modifying suggestive information in an original (or "initial") document such that, in view of the anonymized (or "new," "replacement," "converted," "generated," or "transformed") document, the statistical likelihood that the authority will "detect" the particular characteristic is decreased.

Various implementations of the subject matter disclosed herein provide one or more technical solutions to the technical problem of improving the functionality (e.g., speed, accuracy, etc.) of computer-based systems, where the one or more technical solutions can be practically and practicably applied to improve on existing techniques for using ML processes to anonymize or preserve information, such as by adversarially training a transformation model to anonymize content in a document suggestive of a particular characteristic while preserving relevant content in the document and/or using an adversarially trained transformation model to anonymize suggestive content while preserving relevant content. Various aspects of the present disclosure provide specific steps describing how these specific results are accomplished and how these specific results realize a technological improvement in computer functionality by means of a unique computing solution to a unique computing problem that did not exist prior to computer-based systems that can use ML processes to anonymize or preserve information, neither of which can be performed in the human mind or using pen and paper. As such, implementations of the subject matter disclosed herein provide specific inventive steps describing how desired results are achieved and realize meaningful and significant improvements on existing computer functionality—that is, the performance of systems for use in the evolving technological field of ML-based protection systems.

Figure 1:
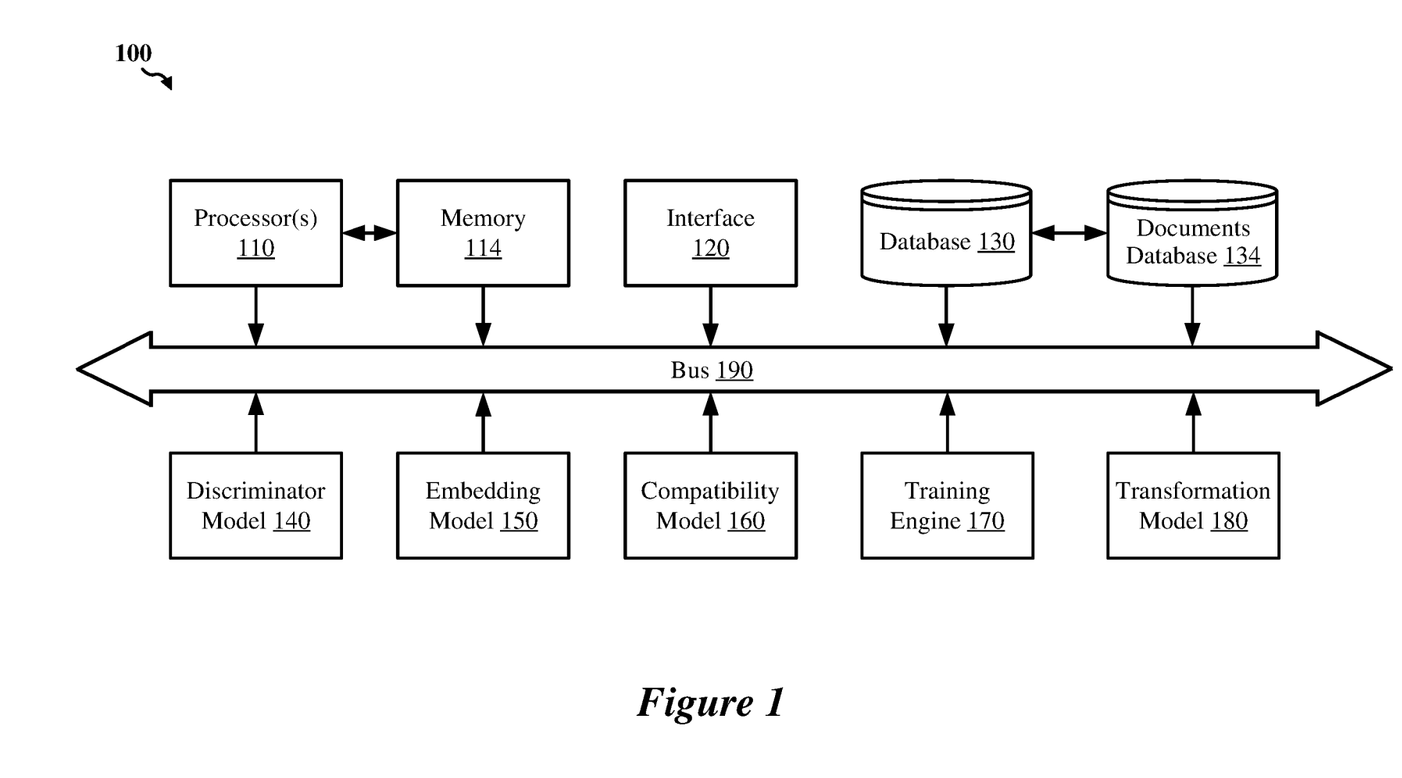
FIG. 1 shows a protection system, according to some implementations.

FIG. 1 shows a protection system 100, according to some implementations. The protection system 100 may also be referred to herein as "the system 100." Various aspects of the system 100 disclosed herein may be generally applicable for adversarially training a transformation model to anonymize content suggestive of a particular characteristic while preserving relevant content, anonymizing content suggestive of a particular characteristic while preserving relevant content using an adversarially trained transformation model, or both. The system 100 may include a combination of one or more processors 110, a memory 114 coupled to the processor 110, an interface 120, one or more databases 130, a documents database 134, a discriminator model 140, an embedding model 150, a compatibility model 160, a training engine 170, and a transformation model 180. In some implementations, the various components of the system 100 are interconnected by at least a data bus 190, as depicted in the example of FIG. 1. In some other implementations, the various components of the system 100 are interconnected using other suitable signal routing resources. While the system 100 and the examples herein are generally described with reference to adversarially anonymizing suggestive content of a document while preserving relevant content in the document, aspects of the present disclosure may be used to perform other anonymization and/or preservation techniques, among other suitable tasks.

In some implementations, the system 100 is configured to adversarially train a transformation model, as further described below in connection with the training engine 170—as well as with respect to FIGS. 2-3. In some other implementations, the system 100 is configured to use a transformation model adversarially trained as such, as further described below in connection with the transformation model 180—as well as with respect to FIGS. 4-5. In yet other implementations, the system 100 is configured to adversarially train a transformation model and is configured to use the adversarially trained transformation model, such as in real-time with obtaining a document from a user, a database, or another appropriate source of a document for anonymization. In some instances, the transformation model may also be trained to maximize an amount of information preserved relating to an applicant's fitness for a given opportunity, as further described below in connection with the compatibility model 160. Aspects of the present disclosure provide specific steps for adversarially training and/or deploying an adversarially trained transformation model to transform an initial document into a new document such that a weighted combination of an anonymization loss and a content loss and/or compatibility loss are minimized, as described below.

The processor 110 may include one or more suitable processors capable of executing scripts or instructions of one or more software programs stored in the system 100, such as within the memory 114. The processor 110 may include a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 110 may include a combination of computing devices, such as a combination of a DSP and a microprocessor, a plurality of microprocessors, one or more microprocessors in conjunction with a DSP core, or any other suitable configuration.

The memory 114, which may be any suitable persistent memory (such as non-volatile memory or non-transitory memory) may store any number of software programs, executable instructions, machine code, algorithms, and the like that can be executed by the processor 110 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The interface 120 may be one or more input/output (I/O) interfaces for receiving input data from a user, outputting data to a user, presenting information to a user, detecting an action of a user, receiving a command from a user, determining a selection made by a user, prompting a user to perform one or more actions, receiving or obtaining data objects (e.g., an original document) from a user, transferring or providing data objects (e.g., a replacement document) to a user, or the like. The interface 120 may also be used to provide or receive other suitable information, such as computer code for updating one or more programs stored on the system 100, internet protocol requests and results, or the like. An example interface may include a wired interface or wireless interface to the internet or other means to communicably couple with user devices or any other suitable devices. For example, the interface 120 may include an interface with an ethernet cable to a modem, which is used to communicate with an internet service provider (ISP) directing traffic to and from user devices and/or other parties. The interface 120 may also be used to communicate with another device within the network to which the system 100 is coupled, such as a smartphone, a tablet, a personal computer, or other suitable electronic device. The interface 120 may also include a display, a speaker, a mouse, a keyboard, or other suitable input or output elements that allow interfacing with the system 100 by a local user or moderator.

The database 130 may store any data associated with the system 100, such as data objects (e.g., documents), models, values, algorithms, labels, annotations, classifications, training data, validation data, user information, features and/or feature values, among other suitable information, such as one or more JSON (JavaScript Object Notation) files, or any other appropriate data. The database 130 may be a part of or separate from the documents database 134 and/or another suitable physical or cloud-based data store. In some implementations, the database 130 may include a relational database capable of presenting information as data sets in tabular form and capable of manipulating the data sets using relational operators. The database 130 may use Structured Query Language (SQL) for queries and/or maintenance. The data sets described below may be in any suitable format for processing by the system 100. For example, the data may be included in one or more JSON files or objects. In another example, the data may be in SQL compliant data sets for filtering and sorting by the system 100, such as by the processor 110.

The documents database 134 may store data associated with transforming documents, such as data objects (e.g., initial documents, new documents) or other data representative of initial documents, document iterations or versions, new documents, document metadata, models, sequences, vectors, word embeddings, particular characteristics, contextual information, opportunity qualifications, loss functions, loss values, weights, among other appropriate data. In some implementations, a document may include information about a person preparing to apply for an opportunity, where the document is the person's curriculum vitae (CV), resume, profile, biographical summary, or any other appropriate representation of information about the person, and where the opportunity is a job, a position, a benefit, a license, an award, a membership, a loan, a scholarship, an admittance, or other appropriate opportunity for which the applicant may apply. The documents database 134 may be a part of or separate from the database 130. In some instances, the documents database 134 includes data stored in one or more cloud object storage services, such as one or more Amazon Web Services (AWS)-based Simple Storage Service (S3) buckets. In some implementations, all or a portion of the data may be stored in a memory separate from the documents database 134, such as in the database 130 or another suitable data store.

The discriminator model 140 may be used to predict a particular characteristic of, or otherwise classify, a person based on the information in the person's document. The discriminator model 140 may incorporate one or more aspects of a natural-language processing (NLP) model, such as for processing text extracted from an input document. For example, an encoder of the discriminator model 140 may incorporate one or more aspects of a recurrent neural network (RNN), such as a long short-term memory (LSTM) network including a plurality of feedback connections for processing data sequences, where a next output from a given LSTM unit is impacted by the previous output. As another example, an encoder of the discriminator model 140 may incorporate one or more aspects of a bidirectional transformer model, such as a next sentence prediction (NSP) technique or a masked language model (MLM).

In some instances, the discriminator model 140 is pre-trained. In some other instances, the training engine 170 trains and/or increases an accuracy of the discriminator model 140 such that an accuracy of the transformation model 180 may be further increased through additional adversarial training against the further trained discriminator model 140. The discriminator model 140 may be trained using sample (or "training") documents each representative of credentials associated with a particular person and labeled based on whether the particular person possesses a particular characteristic. As a non-limiting example, if the particular characteristic is a pregnancy status, a sample document may be labeled 1 if the particular person is identified as pregnant, and the sample document may be labeled 0 if the particular person is not identified as pregnant. In training, the discriminator model 140 may detect, in the sample document, content suggestive of whether the person is pregnant and predict a label for the document, where the label may be a predicted value between 0-1 that indicates a predicted likelihood that the particular person is pregnant.

As another non-limiting example, the discriminator model 140 may be trained to predict whether a given person is married based on the given person's document, and a predicted value of 0 may indicate that the discriminator model 140 predicts a 0% likelihood that the given person is married, a value of 1 may indicate that the discriminator model 140 predicts a 100% likelihood that the given person is married, and a value of 0.5 may indicate that the discriminator model 140 predicts a 50% likelihood that the given person is married, i.e., that the discriminator model 140 is entirely uncertain as to whether the given person is married or not. In some implementations, an accuracy of the discriminator model 140 is optimized using a discriminatory loss function minimizing a cross entropy between actual labels for documents and labels that the discriminator model 140 predicts for the documents, where the cross entropy decreases as the accuracy of the discriminator model 140 increases. Thus, for this example, if the label for the given person's document is 1 (such as if the given person is identified as married), a predicted value of 0 would be 0% accurate with 100% certainty, a predicted value of 1 would be 100% accurate with 100% certainty, and a predicted value of 0.5 would be 50% accurate with 0% certainty. In some implementations, the discriminatory loss is defined as $L_D = -[y*\log(ŷ)]+[(1-y)*\log(1-ŷ)]$, where y represents an actual value (e.g., a supervised annotation) for a document, and where ŷ represents a predicted value for the document. For instance, if the actual value is 1 (e.g., the associated person is identified as possessing the particular characteristic) and the predicted value is 0.9 (relatively high certainty), the discriminatory loss is approximately 0.1 (relatively high accuracy); whereas, if the predicted value is 0.6 (significantly lower certainty), the discriminatory loss is approximately 0.5 (significantly lower accuracy), and if the predicted value is 0.1 (relatively high certainty), the discriminatory loss is approximately 2.3 (exceptionally low accuracy).

In this manner, the trained discriminator model 140 may be used in an adversarial training process whereby the transformation model 180 is trained to "outsmart" or "fool" the discriminator model 140. In some implementations, the training engine 170 may use a defined anonymization (or "adversarial") loss to adversarially train the transformation model 180 against the trained discriminator model 140, where the anonymization loss is indicative of an accuracy at which the discriminator model 140 predicts whether a person associated with a new document (e.g., output by the transformation model 180) possesses a particular characteristic, where the initial document (e.g., from which the new document was transformed) is labeled to indicate whether the person possesses the particular characteristic. The anonymization loss may be incorporated into a combined objective function as an "anonymization layer," as further described below. In some implementations, the anonymization loss is defined as $L_1 = (D(F(X))-0.5)^2$, where $D(F(X))$ represents the predicted value generated by the discriminator model 140 for a new document, F(X). As the $L_1$ anonymization loss increases, new documents generated by the transformation model 180 are expected to cause the trained discriminator model 140 to predict values increasingly closer to 0.5, which would be an $L_1$ anonymization loss of 0. Thus, the transformation model 180 may be adversarially trained to maximize a predicted uncertainty of the discriminator model 140. For this example, if a person associated with an initial document possesses a particular characteristic (i.e., the initial document is labeled 1), the discriminator model 140 may, for example, generate a value of 0.84 for the initial document (e.g., an $L_1$ anonymization loss of 0.12) and, for example, a value of 0.42 for the new, transformed document (e.g., an $L_1$ anonymization loss of 0.01).

In some other implementations, the anonymization loss is defined as $L_1 = (D(F(X))-(1-A(X)))^2$, where $D(F(X))$ again represents the predicted value generated by the discriminator model 140 for the new document, and where $A(X)$ represents the actual label assigned to the initial document. Thus, for this example, the transformation model 180 is adversarially trained such that the discriminator model 140 predicts values increasingly closer to the opposite value of the actual label—that is, if the actual label is 1, predicting (or being expected to predict) the opposite value (0) would correspond to an $L_1$ anonymization loss of 0, and vice versa.

In yet other implementations, the anonymization loss is defined as $L_1 = (D(F(X))-1)^2$, where $D(F(X))$ again represents the predicted value generated by the discriminator model 140 for the new document. For this example, the transformation model 180 is adversarially trained such that the discriminator model 140 predicts values increasingly closer to 1, which would correspond to an $L_1$ anonymization loss of 0. Thus, the transformation model 180 may also be trained to maximize a likelihood that the discriminator model 140 predicts that a transformed document is associated with a person possessing the particular characteristic—that is, whether the associated person possesses the particular characteristic or not.

The embedding model 150 may be used to extract relevant features from a document, where non-limiting examples of relevant features may include content indicative of an associated person's information, education, work experience, honors or awards, competencies or skills, research or publications, licenses or certificates, memberships or affiliations, interests or preferences, hobbies or activities, or the like. In some implementations, the embedding model 150 incorporates one or more aspects of a word-embedding NLP model for mapping input text to a corresponding output vector (e.g., a text2vec model), such as by inputting a document, parsing text in the document into one or more words or word sequences (e.g., sentences, paragraphs, values, bullets, headings, or the like), determining collocation (distance) information among the parsed text, and converting each of the words, sequences, or collocations to corresponding latent representations, such as hidden vectors including encoded values representative of the contextual meanings of the corresponding words or sequences and a resultant vector indicative of the document itself. In some implementations, the embedding model 150 determines the contextual meanings of the words or word sequences using one or more aspects of an RNN, an Attention-based bidirectional transformer model, an LSTM model, or a gated recurrent unit (GRU) mechanism. In these manners, the relevant features in a first document may be compared with the relevant features in a second document based on a difference (e.g., distance) between a latent representation of the first document and a latent representation of the second document. As a non-limiting example, a latent representation of a word sequence including the characters "I presume I did well on the test" may be relatively close in vector space to a latent representation of a word sequence including the characters "I think I did a great job on the exam." In some instances, the embedding model 150 separates keywords from other words in the document, and uses a library of keywords associated with at least one of anonymization, relevancy, or fitness to match against each word or sequence based on its contextual meaning and impact on the losses incorporated into the combined objective function described below. In some implementations, the embedding model 150 is trained using one or more aspects of a context-based Bidirectional Encoder Representations from Transformers (BERT) model, an Embeddings from Language Models (ELMo) model, or a Global Vectors for Words Representations (GloVe) model.

In some implementations, the trained embedding model 150 may also be used in the adversarial training process. For example, the training engine 170 may use a defined content loss to adversarially train the transformation model 180, where the content loss is indicative of a difference between a latent representation of an initial version of a document and a latent representation of a new, transformed version of the document. In some implementations, the content loss is defined as $L_2$=CosineDistance(M(X), M(F(X))), where M(X) represents the latent representation of the relevant content extracted from the initial document, and where M(F(X)) represents the latent representation of the relevant content extracted from the new document. In this manner, the transformation model 180 is adversarially trained such that a trained embedding model 150 would generate a latent representation of the new document that is relatively close in vector space to a latent representation of the initial document—that is, the $L_2$ content loss between the documents decreases as the distance between the latent representations of the documents decreases (approaches 0°). Thus, the transformation model 180 may be adversarially trained to minimize a loss of (i.e., maximize a similarity of) relevant content between the initial document and the new document. The content loss may also be incorporated into the combined objective function as a "content layer." It is to be understood that, in some instances, relevant content may at least partially overlap with suggestive content.

The compatibility model 160 may be trained to extract fitness-related features from a document. In some implementations, the compatibility model 160 may be used in the adversarial training processes. For instance, the training engine 170 may use a defined compatibility loss to adversarially train the transformation model 180 to generate new documents that have relatively similar "fitness-related content" as their corresponding initial documents. In some implementations, the fitness-related content is information about the person corresponding to one or more qualifications or requirements associated with a particular opportunity (such as a particular job), and the compatibility model 160 may be used to detect and maximize a similarity of the content between two documents. For this example, the compatibility loss may be defined as $L_3$=CosineDistance(C(X), C(F(X))), where C(X) represents the latent representation of the fitness-related content included in the initial document, and where C(F(X)) represents the latent representation of the fitness-related content included in the new document—that is, the $L_3$ compatibility loss between the documents decreases as the distance between the latent representations of the documents decreases (approaches 0°). Thus, the transformation model 180 may be adversarially trained to minimize a loss of content representative of the person's fitness for a particular opportunity. In some implementations, the compatibility loss is incorporated into the combined objective function as a "compatibility layer." In some instances, one or more portions of the fitness-related content may overlap with portions of the suggestive and/or relevant content described above.

The compatibility model 160 may be pretrained and/or the training engine 170 may train and/or increase an accuracy of the compatibility model 160. The compatibility model 160 may be trained using sample documents labeled based on whether a person associated with the sample document is granted the corresponding opportunity. For instance, the sample document may be labeled 1 if the person is granted the opportunity and 0 if the person is denied the opportunity. In training, the compatibility model 160 may detect fitness-related content in a sample document, infer desired and/or required qualifications based on attributes of historical opportunities similar to the given opportunity, and predict a label for the document based on matching the detected content with the inferred qualifications, where the label is a value between 0-1 indicating a predicted likelihood that the person associated with the sample document was granted the given opportunity. In some implementations, an accuracy of the compatibility model 160 is optimized using a fitness loss function minimizing a cross entropy between predicted labels and actual labels.

The training engine 170 may be used to adversarially train the transformation model 180, such as with a combined objective function that generates a total loss value for the transformation model 180 based on multiple layers each corresponding to a loss value previously generated in connection with a different model. In some implementations, the combined objective function may be used to generate the total loss value based on a combination of the $L_1$ anonymization loss (the "anonymization layer") and at least one of the $L_2$ content loss (the "content layer") or the $L_3$ compatibility loss (the "compatibility layer"). In some instances, the combined objective function incorporates the $L_1$ anonymization loss, the $L_2$ content loss, and the $L_3$ compatibility loss. In some other instances, the combined objective function incorporates the anonymization loss ("$L_1$") and the content loss ("$L_2$") and not the compatibility loss ("$L_3$"). In such instances, the combined objective function may be defined as $L=\lambda*L_1+(1-\lambda)*L_2$, where $\lambda$ represents an optimal weight to be applied to $L_1$ and $L_2$, which may be preselected by a programmer based on previous training simulations, determined using one or more aspects of an optimization function, and/or dynamically adjusted by the transformation model 180, such as in real-time with obtaining a document, based on attributes of a document, a person, an opportunity, an authority, or the like.

The optimal weight may be a value between 0-1. Setting the optimal weight to a value less than 0.5 may result in the transformation model 180 increasingly minimizing the $L_2$ content loss—and decreasingly minimizing the $L_1$ anonymization loss—as the value approaches 0, i.e., increasingly favoring the preservation of relevant content over the anonymization of suggestive content. Setting the optimal weight to a value greater than 0.5 may result in the transformation model 180 increasingly minimizing the $L_1$ anonymization loss—and decreasingly minimizing the $L_2$ content loss— that is, increasingly favoring the anonymization of suggestive content over the preservation of relevant content. As a non-limiting example, if the transformation model 180 determines that a person possesses a particular characteristic that, if detected by an authority, has a relatively high likelihood of resulting in the person being denied the corresponding opportunity, the optimal weight may be set to a value relatively close to 1, such that anonymization of "suggestive content" in the person's document is prioritized to a greater extent than the preservation of "relevant content" in the person's document. Thus, the optimal weight may be used to train the transformation model 180 to minimize $L_1$ with a first extent of priority and minimize $L_2$ with a second extent of priority. In this manner, a suitable balance of priorities may be customized for a particular person, opportunity, characteristic, or the like.

The training engine 170 may provide the transformation model 180 with a plurality of training documents each annotated to indicate whether an associated person possesses a particular characteristic. The transformation model 180 may input each training document, parse text in the document into one or more words or word sequences (collectively, "sequences"), determine a context of the sequences, and extract at least one of the sequences that, based on the context, suggests that the person possesses the particular characteristic and/or that there is a relatively high likelihood of a trained discriminator model predicting that the person possesses the particular characteristic. In some instances, one or more of the extracted sequences may also include relevant and/or fitness-related content. In determining the context of and extracting the suggestive, relevant, and/or fitness-related content, the transformation model 180 may use one or more aspects of at least one of an RNN, a GRU mechanism, an LSTM or Attention-based bidirectional transformer model, or a BERT, ELMo, or GloVe model, such as in the manners described above.

The transformation model 180 may be used to generate, for each extracted sequence, a corresponding anonymized sequence less suggestive of the particular characteristic and, in some instances, preserving at least some relevant and/or fitness-related content. In some instances, an anonymized sequence may be an empty sequence, such as if the transformation model 180 determines that a particular sequence is relatively suggestive of the particular characteristic and includes a relatively low amount of relevant and/or fitness-related content. The transformation model 180 may transform each training document into a corresponding test document including the anonymized sequences in place of the suggestive sequences, i.e., mapping the non-anonymized text to the anonymized text. In some implementations, the transformation model 180 incorporates one or more aspects of an NLP-based generative language model for converting input text (e.g., in a "source" language) to output text (e.g., in a "target" language), such as an "attention is all you need" architecture or a "seq2seq" model. However, rather than converting a source, initial document to a target, new document, the transformation model 180 may transform the initial source document into a replacement source document, where the sensitive content in the initial source document is replaced with anonymized content. Upon generating the transformed test documents, the training engine 170, the transformation model 180, or both, may determine, for each respective test document, a predicted accuracy (or extent of certainty) at which the trained discriminator model 140 is expected to predict that the associated person possesses the particular characteristic, and may also determine, for each respective test document, a difference between a latent representation of the respective test document and a latent representation of the corresponding training document, such as in the manners described above.

As a non-limiting example, if the particular characteristic is a female gender and, given the test document, the discriminator model 140 predicts (or is expected to predict) a 0% likelihood that the person is of the female gender (i.e., 0% accuracy with 100% certainty), the test document is a "masculine" version of the "feminine" training document. As another non-limiting example, if the particular characteristic is a female gender and, given the test document, the discriminator model 140 predicts (or is expected to predict) a 50% likelihood that the person is of the female gender (i.e., 50% accuracy with 0% certainty), the test document is a "genderless" version of the "feminine" training document. Although the transformation model 180 may determine (such as based on historical data) that the discriminator model 140 will treat an initial sequence "I work as a nurse" as relatively suggestive of a person being of the female gender, and a replacement sequence "AAAA" as not suggestive of a person being of the female gender (i.e., an exceptionally low loss for the anonymization layer), the latent representations of the sequences may be significantly distant in vector space (i.e., an exceptionally high loss for the content and/or compatibility layer), and thus, the transformation model 180 may refrain from replacing "I work as a nurse" with "AAAA". Similarly, the transformation model 180 may refrain from replacing "I work as a nurse" with "I work," for example, as the amount of relevant and/or fitness-related content lost may still be above a threshold. However, if the transformation model 180 determines that the discriminator model 140 will treat "I work in a hospital" as significantly less suggestive than "I work as a nurse," and that a desired extent of relevant and/or fitness-related content is preserved, the transformation model 180 may transform "I work as a nurse" into "I work in a hospital." In some other instances, the transformation model 180 may determine that "I work in a hospital" would result, for example, in a relatively high loss for the compatibility layer (such as if the opportunity is a nursing position), and thus, may refrain from replacing "I work as a nurse" with "I work in a hospital".

In some implementations, during adversarial training, the transformation model 180 may detect (or "learn") one or more vulnerabilities (or "loopholes") within the techniques used by the discriminator model 140 to generate predictions. Thereafter, the transformation model 180 may exploit the vulnerabilities such that a new sequence may preserve a high amount of relevant and/or fitness-related content while also significantly increasing an uncertainty of the discriminator model 140—that is, the transformation model 180 "fools" the discriminator model 140. As a non-limiting example, the transformation model 180 may determine that the discriminator model 140 will treat an initial sequence, "I am a preschool teacher", as a relatively strong indicator that an associated person is of a female gender; however, the transformation model 180 may also detect a vulnerability in the predictive techniques used by the discriminator model 140 that causes the discriminator model 140 to treat "I currently work as a teacher in a preschool" as a relatively weak indicator as to whether the person is of the female gender; and thus, may transform "I am a preschool teacher" into "I currently work as a teacher in a preschool". In this manner, the transformation model 180 may transform the initial, "suggestive" sequence into a new, "anonymized" sequence that significantly reduces the confidence of the discriminator model 140, while also preserving a relatively high amount of relevant content based on latent representations of the initial and new sequences being relatively close in vector space. In some other instances, the transformation model 180 may exploit the vulnerability such that the new sequence increases a "wrongness" of the discriminator model 140, such that, for this example, the discriminator model 140 treats the new sequence as a relatively strong indicator that the person is not associated with the female gender.

In some implementations, the transformation model 180 incorporates one or more aspects of, for example, random forests, logistic regression, one or more decision trees, nearest neighbors, classification trees, control flow graphs, support vector machines, naïve Bayes, Bayesian Networks, value sets, hidden Markov models, or neural networks configured to generate predictions for the intended purpose. In some aspects, the transformation model 180 may incorporate aspects of a neural network of a suitable type, such as a feedforward neural network or a recurrent neural network. For example, the transformation model 180 may incorporate aspects of a deep neural network (DNN), which may have a suitable architecture, such as a feedforward architecture or a recurrent architecture. In some other implementations, the transformation model 180 may incorporate aspects of a forecasting model such that relevant values are generated based at least in part on previous values associated with one or more input features, including interaction input features. Example forecasting models include one or more of an autoregressive (AR) model or a window function. Example AR models to predict values from time series data include an autoregressive integrated moving average (ARIMA) model, a prophet model, or an exponential smoothing model. Example window functions may include a simplified moving average, an exponential moving average, stochastic based smoothing, or a naive forecasting model. Predictions by an example window function may be based on one or more of a mean, a minimum, or a maximum of a predefined number of values in a time series data preceding a predicted value. It is to be understood that the transformation model 180 may incorporate aspects of any number of classification or regression models.

In these and other manners, the training engine 170 may be used to adversarially train the transformation model 180 until the transformation model 180 transforms initial documents into new documents such that the applicable losses ($L_1$, $L_2$, and/or $L_3$) are minimized to their desired extents. The training engine 170 may also be used to recursively and/or iteratively optimize the transformation model 180 until the extents reach new desired extents. In some implementations, the training engine 170 may use annotated documents to validate, further train, or otherwise optimize, the transformation model 180 to further increase the extents. In some aspects, the annotated documents are other documents associated with other people and labeled to indicate whether the people possess the particular characteristic(s), where non-limiting examples of a particular characteristic include a person's gender, race, ethnicity, skin color, genetics, disability status, national origin, nationality, religion, age, marital status, number of children, gender history, pregnancy status, leave status, or any other quality, category, trait, feature, type, class, or attribute of the person that would be inappropriate for an authority to consider in determining whether the person qualifies for an associated opportunity, such as based on one or more known laws, rules, guidelines, beliefs, standards, ethics, agreements, or the like.

Once adversarially trained, the transformation model 180 may be used to transform an initial document into a new document in near real-time with obtaining the document (e.g., via the interface 120 or the documents database 134). For example, the adversarially trained transformation model 180 may obtain an initial document from a person over the interface 120, where the person possesses a particular characteristic. Thereafter, the transformation model 180 may extract suggestive sequences from the initial document based on determining their contextual meanings. The transformation model 180 may then generate anonymized sequences less suggestive of the particular characteristic and preserving some portion of relevant and/or fitness-related content. Thereafter, the transformation model 180 may transform the initial document into a new document with the anonymized sequences in place of the suggestive sequences. In some instances, the system 100 provides the new document to the person or associated entity.

The discriminator model 140, the embedding model 150, the compatibility model 160, the training engine 170, and/or the transformation model 180 may be implemented in software, hardware, or a combination thereof. In some implementations, any one or more of the discriminator model 140, the embedding model 150, the compatibility model 160, the training engine 170, or the transformation model 180 may be embodied in instructions that, when executed by the processor 110, cause the system 100 to perform operations. The instructions of one or more of said components, the interface 120, and/or the documents database 134, may be stored in the memory 114, the database 130, or a different suitable memory. The instructions may be in any suitable programming language format for execution by the system 100, such as by the processor 110. It is to be understood that the particular architecture of the system 100 shown in FIG. 1 is but one example of a variety of different architectures within which aspects of the present disclosure may be implemented. For example, in some implementations, components of the system 100 may be distributed across multiple devices, included in fewer components, and so on. While the below examples of adversarially training a transformation model and/or using an adversarially trained transformation model in real-time are described with reference to the system 100, other suitable system configurations may be used.

Figure 2:
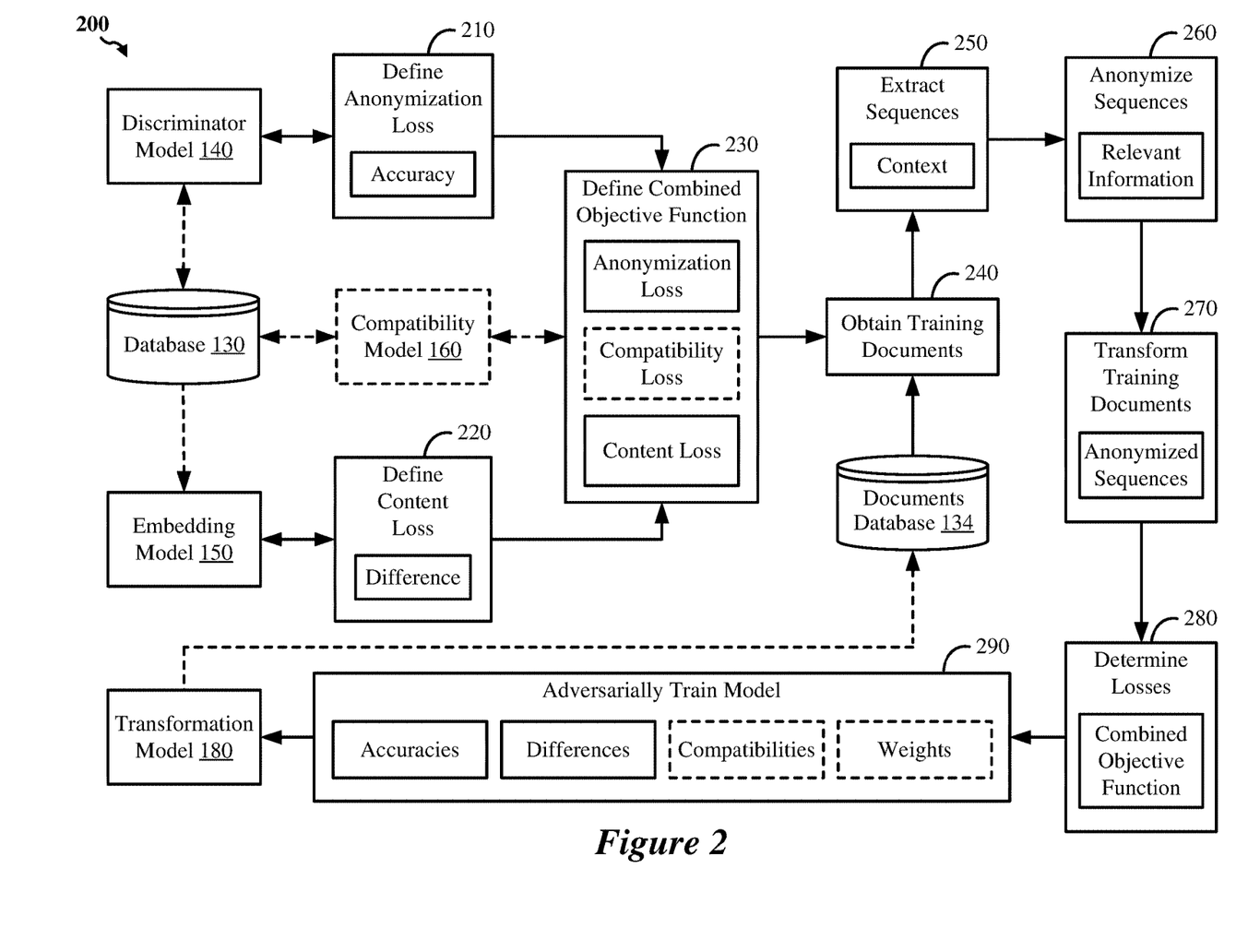
FIG. 2 shows a high-level overview of an example process flow that may be employed by a protection system, according to some implementations.

FIG. 2 shows a high-level overview of an example process flow 200 that may be employed by a protection system, according to some implementations, during which a transformation model (e.g., the transformation model 180) is trained to anonymize suggestive content while preserving relevant and/or fitness-related content. The protection system may be and/or incorporate one or more (including all) aspects described with respect to the system 100 shown in FIG. 1. In some other implementations, the protection system described with respect to FIG. 2 may not incorporate one or more aspects described with respect to the system 100 shown in FIG. 1.

In some implementations, prior to block 210, one or more of the discriminator model 140, the embedding model 150, and the compatibility model 160 may be trained as described in connection with FIG. 1. In some implementations, one or more trained models may be stored in the database 130.

At block 210, the system 100 defines an anonymization loss indicative of an accuracy at which the trained discriminator model 140 can predict a particular characteristic of a person given an initial document representative of the person's credentials. In some implementations, the anonymization loss is defined as $L_1 = (D(F(X)) - 0.5)^2$, where $D(F(X))$ represents a predicted value generated for a new document by the discriminator model 140.

At block 220, the system 100 defines a content loss indicative of a difference between a latent representation of the initial document and a latent representation of the new document, such as generated by the embedding model 150. In some implementations, the content loss is defined as $L_2 = \text{CosineDistance}(M(X), M(F(X)))$, where $M(X)$ represents the latent representation of the initial document and M(F(X)) represents the latent representation of the new document.

At block 230, the system 100 defines a combined objective function that generates a total loss value based on multiple layers each corresponding to a loss value previously generated for a different layer. In some implementations, the combined objective function incorporates the anonymization loss and the content loss and minimizes the accuracy referenced with respect to block 210 while simultaneously minimizing the difference referenced with respect to block 220. In some other implementations, the combined objective function may incorporate the compatibility loss.

At block 240, the system 100 obtains a plurality of training documents, such as from the documents database 134.

At block 250, the system 100 extracts, from each of the training documents, one or more sequences that, based on a context of the words in the sequences, suggests that an associated person possesses the particular characteristic.

At block 260, the system 100 generates new sequences that are less suggestive of the particular characteristic and preserve a desired extent of relevant and/or fitness-related information about the person.

At block 270, the system 100 transforms the training documents into test documents including the new sequences in place of the suggestive sequences.

At block 280, the system 100 determines, for each test document, an accuracy at which the discriminator model 140 predicts that the associated person possesses the particular characteristic, and determines a difference between latent representations of the corresponding test and training documents.

At block 290, the system 100 adversarially trains, using the determined accuracies and the determined differences in the combined objective function, the transformation model 180 to transform a given document representative of credentials of a given person possessing the particular characteristic into an anonymized document maximizing a predicted uncertainty of the trained discriminator model while simultaneously maximizing an amount of relevant content and/or fitness-related content preserved from the initial document.

In some implementations, after block 290, the system 100 annotates and provides one or more of the new documents to the documents database 134 for further training.

FIG. 3 shows a high-level overview of an example process flow 300 that may be employed by the system 100 of FIG. 1 and/or the protection system described with respect to FIG. 2, according to some implementations, during which a transformation model (e.g., the transformation model 180) is adversarially trained to anonymize content suggestive of a particular characteristic while preserving relevant content and/or fitness-related content. At block 310, the system 100 defines an anonymization loss indicative of an accuracy at which a trained discriminator model can predict a particular characteristic of a person given a document representative of the person's credentials. At block 320, the system 100 defines a content loss indicative of a difference between a latent representation of a first version of the document and a latent representation of a second version of the document. At block 330, the system 100 defines a combined objective function incorporating the anonymization loss and the content loss and minimizing the accuracy while simultaneously minimizing the difference. At block 340, the system 100 extracts, from each of a plurality of training documents, at least one sequence of words that, based on a context of the words in the sequence, suggests that a person associated with the training document possesses the particular characteristic. At block 350, the system 100 generates, for each extracted sequence, an anonymized sequence less suggestive of the particular characteristic and preserving at least some relevant information about the person. At block 360, the system 100 transforms each training document into a corresponding test document including the anonymized sequences in place of the suggestive sequences. At block 370, the system 100 determines, for each test document, an accuracy at which the trained discriminator model predicts that the associated person possesses the particular characteristic. At block 380, the system 100 determines, for each test document, a difference between a latent representation of the test document and a latent representation of the corresponding training document. At block 390, the system 100 adversarially trains, using the determined accuracies and the determined differences in the combined objective function, a transformation model to transform a given document representative of credentials of a given person possessing the particular characteristic into an anonymized document maximizing a predicted uncertainty of the trained discriminator model while simultaneously maximizing an amount of relevant information about the person preserved.

Figure 4:
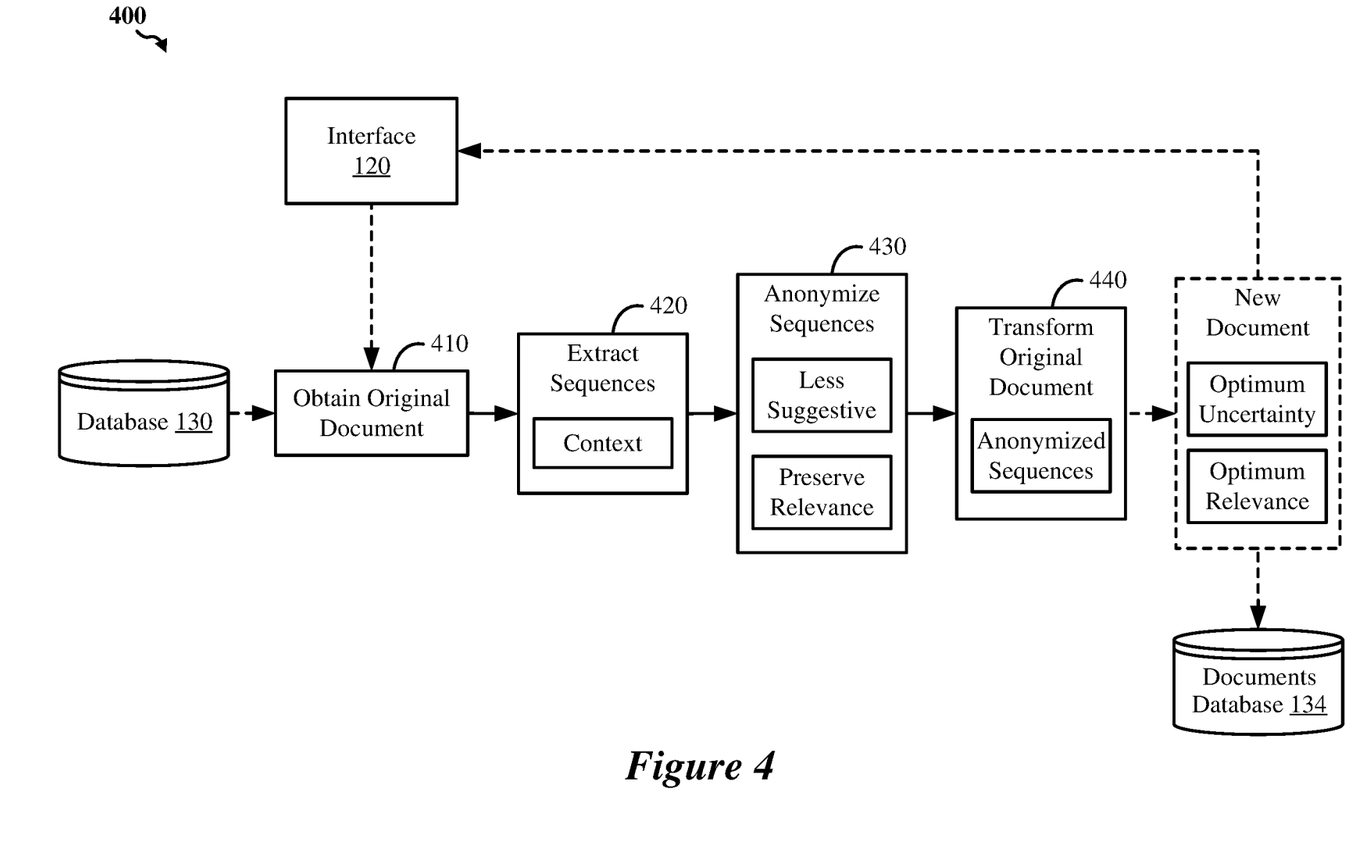
FIG. 4 shows a high-level overview of an example process flow that may be employed by a protection system, according to some implementations.

FIG. 4 shows a high-level overview of an example process flow 400 that may be employed by a protection system, according to some implementations, during which an adversarially trained transformation model (e.g., the adversarially trained transformation model 180) anonymizes suggestive content while preserving relevant content and/or fitness-related content, such as in real-time with obtaining an associated document. The protection system may be and/or incorporate one or more (including all) aspects described with respect to the system 100 shown in FIG. 1. In some other implementations, the protection system described with respect to FIG. 4 may not incorporate one or more aspects described with respect to the system 100 shown in FIG. 1, such as, in various implementations, the interface 120, the database 130, the documents database 134, the discriminator model 140, the embedding model 150, the compatibility model 160, and/or the training engine 170.

At block 410, the system 100 obtains an original document, such as via the interface 120 (e.g., from a user) or the database 130. The original document may be representative of credentials of a person (or other entity), and may be submitted to the system 100 for transformation into a new document for use in applying for an opportunity. In some implementations, the person is associated with at least one particular characteristic inappropriate for consideration in determining whether the person qualifies for the opportunity.

At block 420, the system 100 extracts one or more sequences from the original document. For example, the system 100 may determine a context of the words in the sequences and extract sequences that are suggestive of the particular characteristic(s). In some implementations, the system 100 identifies the suggestive sequences given a characteristic specified by a user, selected by a programmer, and/or identified by another entity, such as the system 100 itself. For example, the system 100 may identify one or more potentially suggested characteristics based on the context, and in some instances, request a selection of one or more of the characteristics for anonymization.

At block 430, the system 100 generates an anonymized sequence from each of the extracted sequences, where each of the anonymized sequences is less suggestive of the particular characteristic and preserves at least some relevant and/or fitness-related information.

At block 440, the transformation model 180 transforms the original document into a new document including the anonymized sequences. Specifically, the new document may include the content of the original document except with the anonymized sequences in place of the suggestive sequences. The new document may optimize (e.g., to a desired extent) a predicted uncertainty of the discriminator model while simultaneously optimizing (e.g., to desired extents) an amount of relevant and/or fitness-related content preserved.

In some implementations, after block 440, the system 100 provides the new document to the interface 120 (such as for a user, person, or entity) and/or the documents database 134 (such as for further training).

Figure 5:
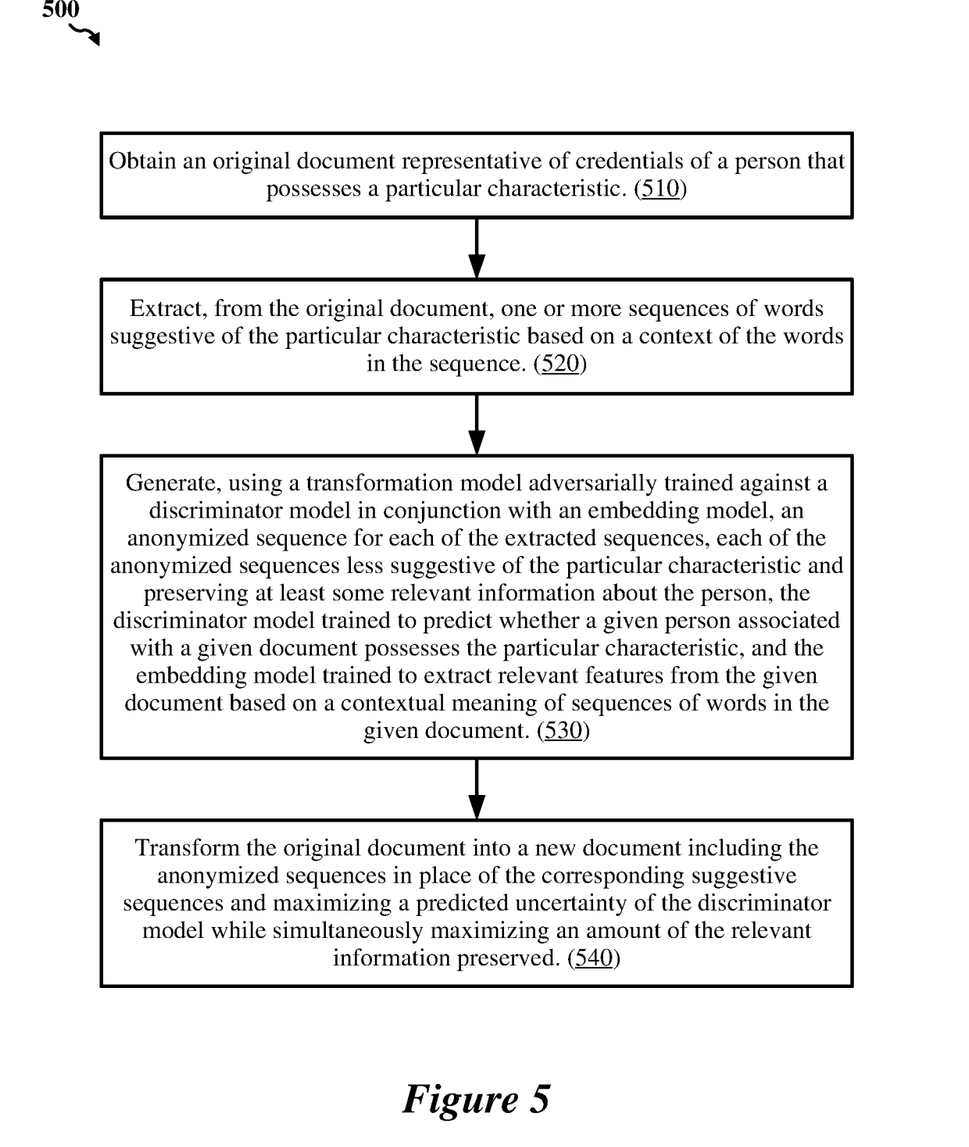
FIG. 5 shows an illustrative flowchart depicting an example operation for anonymizing content suggestive of a particular characteristic while preserving relevant content, according to some implementations.

FIG. 5 shows a high-level overview of an example process flow 500 that may be employed by the system 100 of FIG. 1 and/or the protection system described with respect to FIG. 4, according to some implementations, during which a transformation model (e.g., the adversarially trained transformation model 180) anonymizes content suggestive of a particular characteristic while preserving relevant and/or fitness-related content. At block 510, the system 100 obtains an original document representative of credentials of a person that possesses a particular characteristic. At block 520, the system 100 extracts, from the original document, one or more sequences of words suggestive of the particular characteristic based on a context of the words in the sequence. At block 530, the system 100 generates, using a transformation model adversarially trained against a discriminator model in conjunction with an embedding model, an anonymized sequence for each of the extracted sequences, each of the anonymized sequences less suggestive of the particular characteristic and preserving at least some relevant information about the person, the discriminator model trained to predict whether a given person associated with a given document possesses the particular characteristic, and the embedding model trained to extract relevant features from the given document based on a contextual meaning of sequences of words in the given document. At block 540, the system 100 transforms the original document into a new document including the anonymized sequences in place of the corresponding suggestive sequences and maximizing a predicted uncertainty of the discriminator model while simultaneously maximizing an amount of the relevant information preserved.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other suitable configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure and the principles and novel features disclosed herein.

What is claimed is:

1. A method for adversarially training a transformation model to anonymize content suggestive of a particular characteristic while preserving relevant content, the method performed by one or more processors of a protection system and comprising:
- defining an anonymization loss indicative of an accuracy at which a trained discriminator model can predict a particular characteristic of a person given a document representative of the person's credentials;
- defining a content loss indicative of a difference between a latent representation of a first version of the document and a latent representation of a second version of the document;
- defining a combined objective function incorporating the anonymization loss and the content loss and minimizing the accuracy while simultaneously minimizing the difference;
- extracting, from each of a plurality of training documents, at least one sequence of words that, based on a context of the words in the sequence, suggests that a person associated with the training document possesses the particular characteristic;
- generating, for each extracted sequence, an anonymized sequence less suggestive of the particular characteristic and preserving at least some relevant information about the person;
- transforming each training document into a corresponding test document including the anonymized sequences in place of the suggestive sequences;
- determining, for each test document, an accuracy at which the trained discriminator model predicts that the associated person possesses the particular characteristic;
- determining, for each test document, a difference between a latent representation of the test document and a latent representation of the corresponding training document; and
- adversarially training, using the determined accuracies and the determined differences in the combined objective function, a transformation model to transform a given document representative of credentials of a given person possessing the particular characteristic into an anonymized document maximizing a predicted uncertainty of the trained discriminator model while simultaneously maximizing an amount of relevant information about the person preserved.

2. The method of claim 1, wherein the discriminator model is a natural-language processing (NLP) model, and wherein an encoder of the discriminator model incorporates one or more aspects of a long short-term memory (LSTM) model or a bidirectional transformer model incorporating one or more aspects of next sentence prediction (NSP) or a masked language model (MLM).

3. The method of claim 1, wherein the discriminator model is trained using sample documents each labeled based on whether a person associated with the sample document possesses the particular characteristic, wherein the discriminator model is trained based on detecting content in the sample documents suggestive of the particular characteristic and predicting a label for each of the sample documents, and wherein an accuracy of the discriminator model is optimized using a discriminatory loss function minimizing a cross entropy between the predicted labels and the assigned labels.

4. The method of claim 1, wherein the difference between the latent representations represents an amount of relevant information about the person lost during a transformation of the first version of the document to the second version of the document.

5. The method of claim 4, wherein the relevant information includes at least one of the person's contact information, the person's education, the person's work experience, the person's honors or awards, the person's competencies or skills, the person's research or publications, the person's licenses or certificates, the person's memberships or affiliations, the person's interests or preferences, or the person's hobbies or activities.

6. The method of claim 1, wherein the latent representation of the first version of the document is a first vector including embedded values corresponding to a positional context of relevant features extracted from the first version of the document and the latent representation of the second version of the document is a second vector including embedded values corresponding to a positional context of relevant features extracted from the second version of the document, wherein the difference between the latent representations is determined based on a cosine similarity or a cosine distance between the first vector and the second vector in a vector space.

7. The method of claim 6, wherein a trained embedding model extracts the relevant features from the documents based on a contextual meaning of sequences of words in the documents, wherein the embedding model is a natural-language processing (NLP) model trained using one or more aspects of a Bidirectional Encoder Representations from Transformers (BERT) model, an Embeddings from Language Models (ELMo) model, or a Global Vectors for Words Representations (GloVe) model.

8. The method of claim 1, wherein each of the training documents is at least one of a curriculum vitae (CV), a resume, a profile, or a biographical summary of the person, wherein the document is associated with an opportunity for which the person may apply, wherein the relevant information about the person is applicable to the opportunity, wherein the opportunity is at least one of a job, a position, a benefit, a license, an award, a membership, a loan, a scholarship, or an admittance, and wherein the particular characteristic is at least one of a gender of the person, a race of the person, an ethnicity of the person, a color of the person's skin, genetic information associated with the person, a disability status of the person, a national origin of the person, a current nationality of the person, a religious belief associated with the person, the person's age, the person's marital status, a number of children associated with the person, whether the person has changed genders, or a pregnancy or leave associated with the person.

9. The method of claim 1, wherein the context of the words in the sequences is determined using one or more aspects of a contextual natural-language processing (NLP) model trained to transform an input sequence into an anonymized output sequence.

10. The method of claim 9, wherein the contextual NLP model incorporates one or more aspects of at least one of a recurrent neural network (RNN), an Attention-based bidirectional transformer model, a long short-term memory (LSTM) model, or a gated recurrent unit (GRU) mechanism.

11. A method for anonymizing content suggestive of a particular characteristic while preserving relevant content, the method performed by one or more processors of a protection system and comprising:

obtaining an original document representative of credentials of a person that possesses a particular characteristic;

extracting, from the original document, one or more sequences of words suggestive of the particular characteristic based on a context of the words in the sequence;

generating, using a transformation model adversarially trained against a discriminator model in conjunction with an embedding model, an anonymized sequence for each of the extracted sequences, each of the anonymized sequences less suggestive of the particular characteristic and preserving at least some relevant information about the person, the discriminator model trained to predict whether a given person associated with a given document possesses the particular characteristic, and the embedding model trained to extract relevant features from the given document based on a contextual meaning of sequences of words in the given document; and transforming the original document into a new document including the anonymized sequences in place of the corresponding suggestive sequences and maximizing a predicted uncertainty of the discriminator model while simultaneously maximizing an amount of the relevant information preserved.

12. The method of claim 11, wherein the original document is at least one of a curriculum vitae (CV), a resume, a profile, or a biographical summary of the person, wherein the document is associated with an opportunity for which the person may apply, and wherein the relevant information about the person is applicable to the opportunity, wherein the opportunity is at least one of a job, a position, a benefit, a license, an award, a membership, a loan, a scholarship, or an admittance.

13. The method of claim 11, wherein the particular characteristic is at least one of a gender of the person, a race of the person, an ethnicity of the person, a color of the person's skin, genetic information associated with the person, a disability status of the person, a national origin of the person, a current nationality of the person, a religious belief associated with the person, the person's age, the person's marital status, a number of children associated with the person, whether the person has changed genders, or a pregnancy or leave associated with the person.

14. The method of claim 11, wherein the context of the words in the one or more sequences is determined using one or more aspects of a contextual natural-language processing (NLP) model trained to transform an input sequence into an anonymized output sequence, wherein the contextual NLP model incorporates one or more aspects of at least one of a recurrent neural network (RNN), an Attention-based bidirectional transformer model, a long short-term memory (LSTM) model, or a gated recurrent unit (GRU) mechanism.

15. The method of claim 11, wherein the transformation model is adversarially trained using a combined objective function defined to minimize an anonymization loss indicative of an accuracy at which the discriminator model predicts whether a given person possesses the particular characteristic while simultaneously minimizing a content loss indicative of a difference between a latent representation of the given document and a latent representation of an anonymized document transformed from the given document.

16. The method of claim 11, wherein the discriminator model is a natural-language processing (NLP) model incorporating one or more aspects of a long short-term memory (LSTM) model or a bidirectional transformer model incorporating one or more aspects of next sentence prediction (NSP) or a masked language model (MLM).

17. The method of claim 11, wherein the embedding model is a natural-language processing (NLP) model incorporating one or more aspects of a Bidirectional Encoder Representations from Transformers (BERT) model, an Embeddings from Language Models (ELMo) model, or a Global Vectors for Words Representations (GloVe) model.

18. The method of claim 11, wherein the relevant information includes at least one of the person's contact information, the person's education, the person's work experience, the person's honors or awards, the person's competencies or skills, the person's research or publications, the person's licenses or certificates, the person's memberships or affiliations, the person's interests or preferences, or the person's hobbies or activities.

19. The method of claim 11, wherein the new document is provided to the person or an associated entity.

20. A system for anonymizing content suggestive of a particular characteristic while preserving relevant content, the system comprising:

one or more processors; and at least one memory coupled to the one or more processors and storing instructions that, when executed by the one or more processors, cause the system to perform operations including:

obtaining an original document representative of credentials of a person that possesses a particular characteristic;

extracting, from the original document, one or more sequences of words suggestive of the particular characteristic based on a context of the words in the sequence;

generating an anonymized sequence for each of the extracted sequences using a transformation model adversarially trained against a discriminator model in conjunction with an embedding model, each of the anonymized sequences less suggestive of the particular characteristic and preserving at least some relevant information about the person, the discriminator model trained to predict whether a given person associated with a given document possesses the particular characteristic, and the embedding model trained to extract relevant features from the given document based on a contextual meaning of sequences of words in the given document; and transforming the original document into a new document including the anonymized sequences in place of the corresponding suggestive sequences and maximizing a predicted uncertainty of the discriminator model while simultaneously maximizing an amount of the relevant information preserved.

* * * * *